(12) United States Patent
Akkarakaran et al.

(10) Patent No.: US 11,063,800 B2
(45) Date of Patent: Jul. 13, 2021

(54) SYNCHRONIZATION SIGNALING SUPPORTING MULTIPLE WAVEFORMS

(71) Applicant: QUALCOMM Incorporated, San Diego, CA (US)

(72) Inventors: Sony Akkarakaran, Poway, CA (US); Tao Luo, San Diego, CA (US); Jing Sun, San Diego, CA (US); Rahul Malik, San Diego, CA (US); Tamer Kadous, San Diego, CA (US); Akula Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 15/936,311

(22) Filed: Mar. 26, 2018

(65) Prior Publication Data

US 2018/0287840 A1 Oct. 4, 2018

Related U.S. Application Data

(60) Provisional application No. 62/481,643, filed on Apr. 4, 2017.

(51) Int. Cl.
*H04L 27/26* (2006.01)
*H04L 5/00* (2006.01)

(52) U.S. Cl.
CPC ........ *H04L 27/2604* (2013.01); *H04L 27/262* (2013.01); *H04L 27/2613* (2013.01);
(Continued)

(58) Field of Classification Search
None
See application file for complete search history.

(56) References Cited

U.S. PATENT DOCUMENTS

2016/0182270 A1* 6/2016 Jungnickel ........ H04L 25/03828
375/260
2018/0007673 A1* 1/2018 Fwu ........................ H04W 4/70
(Continued)

OTHER PUBLICATIONS

Beradinelli et al. "Generalized DFT-Spread-OFDM as 5G Waveform" IEEE Communications Magazine Nov. 2016 (Year: 2016).*
(Continued)

*Primary Examiner* — Jeffrey M Rutkowski
*Assistant Examiner* — Basil Ma
(74) *Attorney, Agent, or Firm* — Loza & Loza, LLP

(57) ABSTRACT

Aspects of the disclosure relate to synchronization signaling supporting multiple waveforms. A synchronization signal block (SSB) is configurable for transmission using either at least a first waveform or a second waveform, where the first waveform has higher peak to average power ratio (PAPR) characteristics such as OFDM and the second waveform has lower PAPR characteristics, such as DFT-S-OFDM. The SSB is transmitted selectively using either the first waveform or the second waveform for transmission of the SSB. Furthermore, the characteristics of the transmission such as a predetermined pattern of the first and second waveform transmissions may be utilized to communicate to a receiver the type of waveform being used. In this manner, SSB transmissions may take advantage of respective advantages afforded by each type of waveform, particularly when using higher frequency transmissions above 40 GHz in wireless communication systems.

35 Claims, 13 Drawing Sheets

(52) U.S. Cl.
CPC ........ *H04L 27/2692* (2013.01); *H04L 5/0048* (2013.01); *H04L 27/2614* (2013.01); *H04L 27/2636* (2013.01)

(56) References Cited

U.S. PATENT DOCUMENTS

| | | | |
|---|---|---|---|
| 2018/0084593 A1* | 3/2018 | Chen | H04W 76/11 |
| 2018/0091249 A1* | 3/2018 | Han | H04J 11/0076 |
| 2020/0100186 A1* | 3/2020 | Osawa | H04W 52/367 |

OTHER PUBLICATIONS

Lien et al "5G New Radio: Waveform, Frame Structure, Multiple Access and Initial Access" IEEE Communications Magazine Jun. 2017 (Year: 2017).*
Ghosh A., et al., "LTE-Advanced: Next-Generation Wireless Broadband Technology", IEEE Wireless Communications, IEEE Service Center, Piscataway, NJ, US, vol. 17, No. 3, Jun. 1, 2010 (Jun. 1, 2010), pp. 10-22, XP011311803, ISSN: 1536-1284.
I C-L., et al., "New Paradigm of 5G Wireless Internet", IEEE Journal on Selected Areas in Communications, IEEE Service Center, Piscataway, US, vol. 34, No. 3, Mar. 1, 2016 (Mar. 1, 2016), pp. 474-482, XP011602761, ISSN: 0733-8716, DOI: 10.1109/JSAC. 2016.2525739 [retrieved on Mar. 10, 2016].
International Search Report and Written Opinion—PCT/US2018/ 024645—ISA/EPO—dated Jun. 25, 2018.
Schaich F., et al., "Relaxed Synchronization Support of Universal Filtered Multi-Carrier Including Autonomous Timing Advance", 2014 11th International Symposium on Wireless Communications Systems (ISWCS), IEEE, Aug. 26, 2014 (Aug. 26, 2014), pp. 203-208, XP032666567, DOI: 10.1109/ISWCS.2014.6933347 [retrieved on Oct. 21, 2014].
Abdullah I., et al., "Comparative Study of PAPR Reduction Techniques in OFDM," ARPN Journal of Systems and Software, Nov. 2011, vol. 1, No. 8, ISSN 2222-9833, pp. 263-269.
Estevez C., et al., "60 GHz Millimeter-wave Bottom-Layer Solutions: Multiplexing Access, Energy Awareness, and Peak-to-Average-Power Ratio," IEEE Latin-America Conference on Communications (LATINCOM), Nov. 2014, 6 pages.
Jiang T., et al., "An Overview: Peak-to-Average Power Ratio Reduction Techniques for OFDM Signals," IEEE Transactions on Broadcasting, Jun. 2008, vol. 54, No. 2, pp. 257-268.
Paredes M.C.P., et al., "The Problem of Peak-to-Average Power Ratio in OFDM Systems," Mar. 28, 2015, 8 pages.

* cited by examiner

US 11,063,800 B2

SYNCHRONIZATION SIGNALING SUPPORTING MULTIPLE WAVEFORMS

PRIORITY CLAIM

This application claims priority to and the benefit of Provisional Patent Application No. 62/481,643, filed in the United States Patent and Trademark Office on Apr. 4, 2017, the entire content of which is incorporated herein by reference as if fully set forth below in its entirety and for all applicable purposes.

TECHNICAL FIELD

The technology discussed below relates generally to wireless communication systems, and more particularly, to methods and apparatus for synchronization signal block designs or configurations that support multiple waveforms.

INTRODUCTION

In particular wireless technologies and standards such as the evolving 3GPP 5G New Radio (NR) standard, particular high frequency transmission waveforms and protocols have been proposed. For example, for NR millimeter wave (mm-Wave) transmissions with RF carrier frequencies less than 40 GHz, orthogonal frequency division multiplexing (OFDM) may be used as the transmission waveform for downlink (DL) transmissions. As even higher RF carrier frequencies above 40 GHz begin to be utilized, however, the peak-to-average power ratio (PAPR) of such wireless transmissions increases. Thus, it becomes advantageous to use other waveforms for DL transmissions that afford lower PAPRs at these higher frequencies, such as Discrete Fourier Transform spread OFDM (DFT-S-OFDM). Accordingly, it may be advantageous to utilize multiple types of waveforms for higher RF frequency transmission to capitalize on the respective advantages afforded by each type of waveform. For example, the NR standard might incorporate both OFDM and DFT-S-OFDM for DL transmissions for RF carrier frequencies above 40 GHz.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to an aspect, a method of wireless communication is disclosed. The method includes determining within a transceiver a synchronization signal block (SSB) that is configurable for transmission using at least one of a first waveform or a second waveform. Further, the method also includes transmitting the SSB through selectively using the first waveform or the second waveform for transmission of the SSB.

In another aspect, an apparatus for wireless communication is disclosed including means for determining within a transceiver a synchronization signal block (SSB) that is configurable for transmission using at least one of a first waveform or a second waveform. Additionally, the apparatus includes means for transmitting the SSB through selectively using the first waveform or the second waveform for transmission of the SSB.

In still another aspect, a non-transitory computer-readable medium storing computer-executable code is disclosed. The medium includes code for causing a computer to determine within a transceiver a synchronization signal block (SSB) that is configurable for transmission using at least one of a first waveform or a second waveform. The code also causes a computer to transmit the SSB through selectively using the first waveform or the second waveform for transmission of the SSB. In yet one other aspect, an apparatus for wireless communication is disclosed including a processor, a transceiver communicatively coupled to the at least one processor, and a memory communicatively coupled to the at least one processor. The processor, in particular, is configured to receive a synchronization signal block or synchronization signal burst-set that is transmitted from a base station using at least one of a first waveform or a second waveform, where the base station transmitted the synchronization signal block or synchronization signal burst-set by selectively utilizing the first waveform or the second waveform. Additionally, the processor is configured to determine the type of waveform being selectively used for transmission of at least a portion of the synchronization signal block or synchronization signal burst-set based on a characteristic of the transmission of the synchronization signal block or synchronization signal burst-set. Based on the determination of the type of waveform, the processor is further configured to decode the synchronization signal block or synchronization signal burst-set.

DETAILED DESCRIPTION

Figure 1:
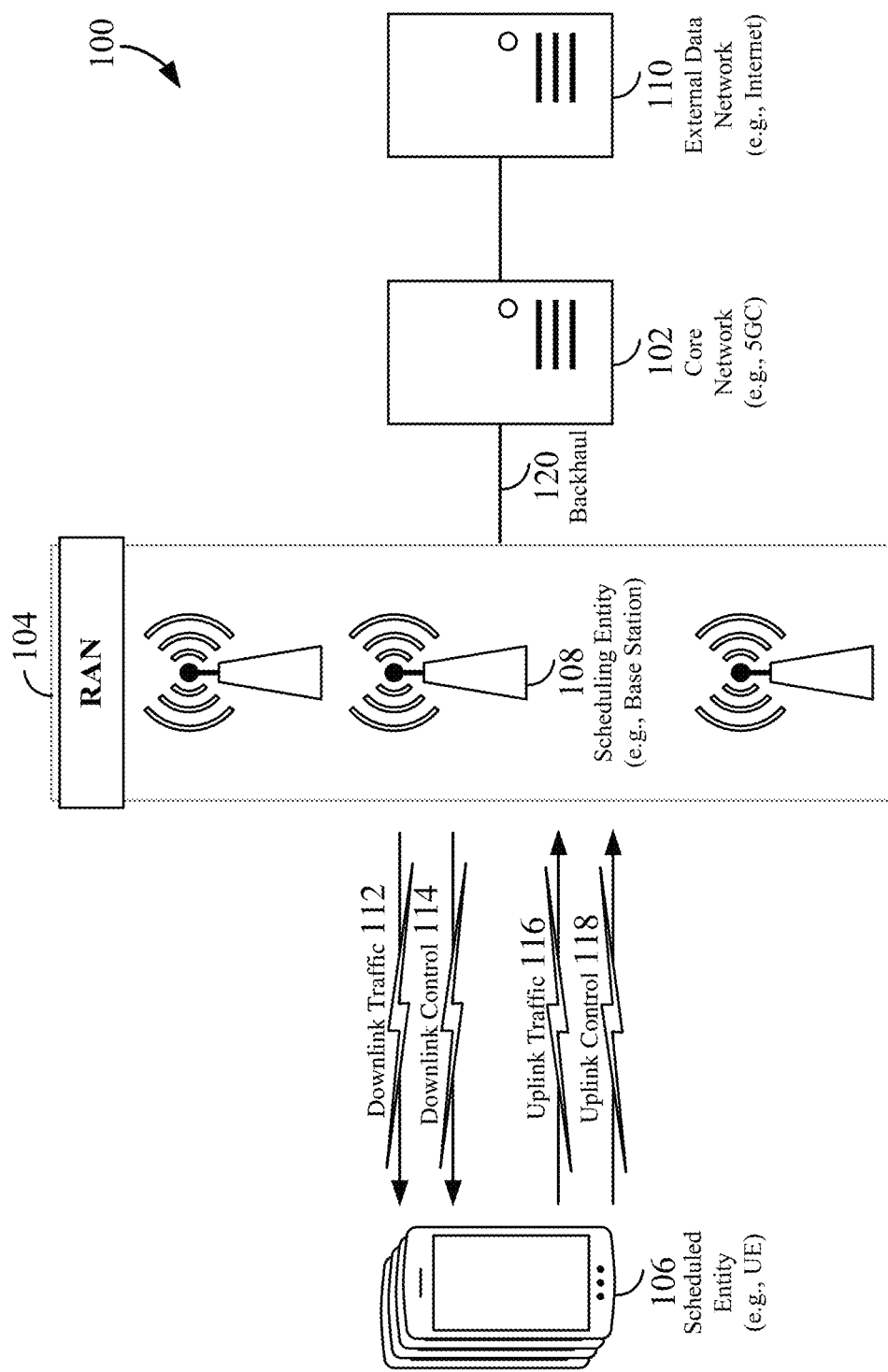
FIG. 1 is a schematic illustration of a wireless communication system.

The detailed description set forth below in connection with the drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In the following disclosure, the present methods and apparatus discussed provide synchronization (synch) channel structures and a physical broadcast channel (pBCH) that may be used to support dual or multiple waveforms types. In particular, the disclosed synchronization signal and pBCH design options supporting dual/multiple waveforms are configured to selectively utilize at least one of first or second types of waveforms. In further aspects, one of the waveforms may be a low-PAPR waveform and the other waveform may be an OFDM waveform for transmission of at least a portion of a synchronization signal block in order to lower the complexity of a system. It is noted that an OFDM waveform is a superposition of tones with different frequencies, whose constructive and destructive interference in time-domain will more likely result in a high PAPR. A low PAPR waveform, on the other hand, may be created by other techniques apart from OFDM, which will avoid the interference typically seen in OFDM waveforms. Examples of lower PAPR waveforms include DFT-spread OFDM (DFT-S-OFDM), interleaved DFT-spread OFDM (IFDM), or direct time-domain modulation, as examples. In other aspects, it is noted that the definition of a lower PAPR waveform may be any waveform type having a PAPR lower than OFDM waveforms.

It is further noted that in proposed 3GPP NR standards, for a UE or Scheduled device acquiring connection with a cell, such as an eNB or gNB effectuating the cell, a transmitted synchronization signal structure typically located within a slot or subframe is used for synchronization. In the 3GPP NR standards for frequencies below 40 GHz, the synchronization signal structure comprises synchronization signal blocks (SSBs) that may be time division multiplexed (TDM) and may each include a Primary Synchronization signal (PSS), a Secondary Synchronization signal (SSS), a possible third or Tertiary Synchronization Signal (TSS), and the pBCH, which is typically to be read after the other components in an SS block. For frequencies above 40 GHz, while the 3GPP NR standard has not yet been established, either the same or a similar collection of synchronization sub-channels will most likely be utilized, including a channel carrying broadcast system information, such as the pBCH. Also, since a broadcast channel such as the pBCH is broadcast to UEs in a cell and needs to reach edges of the cell area, it may be desirable in many cases to use a low PAPR waveform (e.g., DFT-S-OFDM) for such broadcast channels. However, OFDM may be advantageous for transmission of the pBCH in other situations in order to lower the complexity at a transmitter. Accordingly, the present methods and apparatus propose configuring a synchronization signal design where certain synch slots may use a low-PAPR waveform to ensure coverage throughout a cell, while some other synch slots use an OFDM waveform to gain processing and other advantages, as will be discussed in more detail later herein. Per 3GPP terminology, the pBCH is also part of synchronization signal, and thus part of each SS block, just like PSS, SSS, and possibly TSS.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

Legacy compatibility: may refer to the capability of a 5G network to provide connectivity to pre-5G devices, and the capability of 5G devices to obtain connectivity to a pre-5G network.

mmWave: millimeter-wave. Generally refers to high frequency bands above 24 GHz, which can provide a very large bandwidth.

Beamforming: directional signal transmission or reception. For a beamformed transmission, the amplitude and phase of each antenna in an array of antennas may be precoded, or controlled to create a desired (i.e., directional) pattern of constructive and destructive interference in the wavefront.

Duplex: a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and interference cancellation techniques. Full duplex emulation is frequently implemented for wireless links by utilizing frequency division duplex (FDD) or time division duplex (TDD). In FDD, the transmitter and receiver at each endpoint operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction.

OFDM: orthogonal frequency division multiplexing. An air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

CP: cyclic prefix. A multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

Scalable numerology: in OFDM, to maintain orthogonality of the subcarriers or tones, the subcarrier spacing is equal to the inverse of the symbol period. A scalable numerology refers to the capability of the network to select different subcarrier spacings, and accordingly, with each spacing, to select the corresponding symbol period. The symbol period should be short enough that the channel does not significantly vary over each period, in order to preserve orthogonality and limit inter-subcarrier interference.

RSMA: resource spread multiple access. A non-orthogonal multiple access scheme generally characterized by small, grantless data bursts in the uplink where signaling over head is a key issue, e.g., for IoT.

QoS: quality of service. The collective effect of service performances which determine the degree of satisfaction of a user of a service. QoS is characterized by the combined aspects of performance factors applicable to all services, such as: service operability performance; service accessibility performance; service retainability performance; service integrity performance; and other factors specific to each service.

RS: reference signal. A predefined signal known a priori to both transmitters and receivers and transmitted through the wireless channel, and used for, among other things, for channel estimation of the wireless channel and coherent demodulation at a receiver.

DMRS: Demodulation reference signal. A predefined signal known a priori to both transmitters and receivers and transmitted through the wireless channel signal typically in UL transmissions that is used for channel estimation and for coherent demodulation.

pBCH: Physical Broadcast Channel A broadcast channel used to transmit parameters used for initial access of a cell such as downlink system bandwidth and System Frame Number, and may include the use of a master information block (MIB) to transmit the parameters PSS/SSS/TSS: Primary Synchronization signal/Secondary Synchronization signal/Tertiary Synchronization Signal. Synchronization signals that are used by a UE to acquire a DL signal from an eNB or gNB, and are typically read prior to reading the pBCH.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
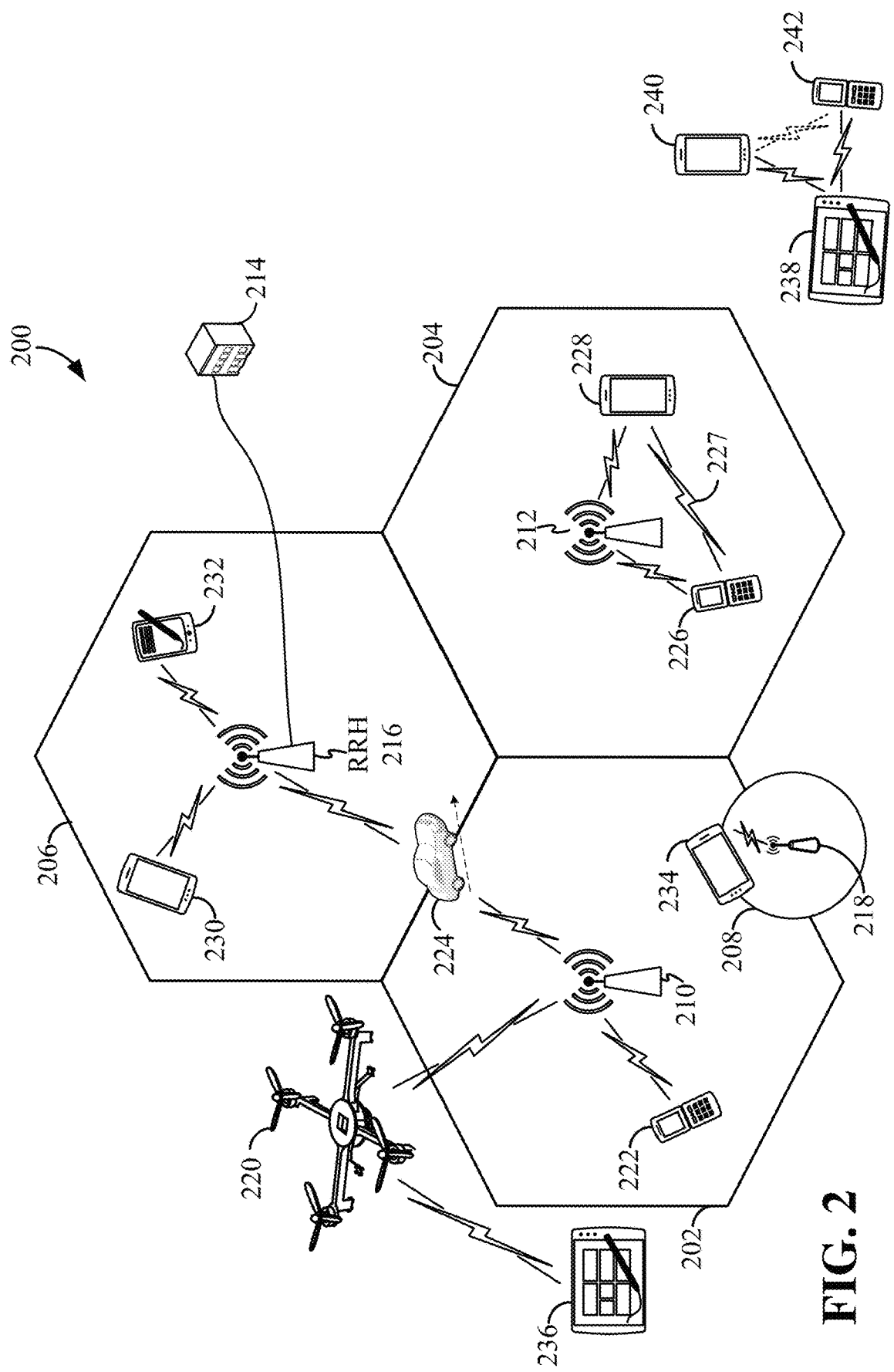
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs), Tertiary Synchronization Signals (TSSs), and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Figure 3:
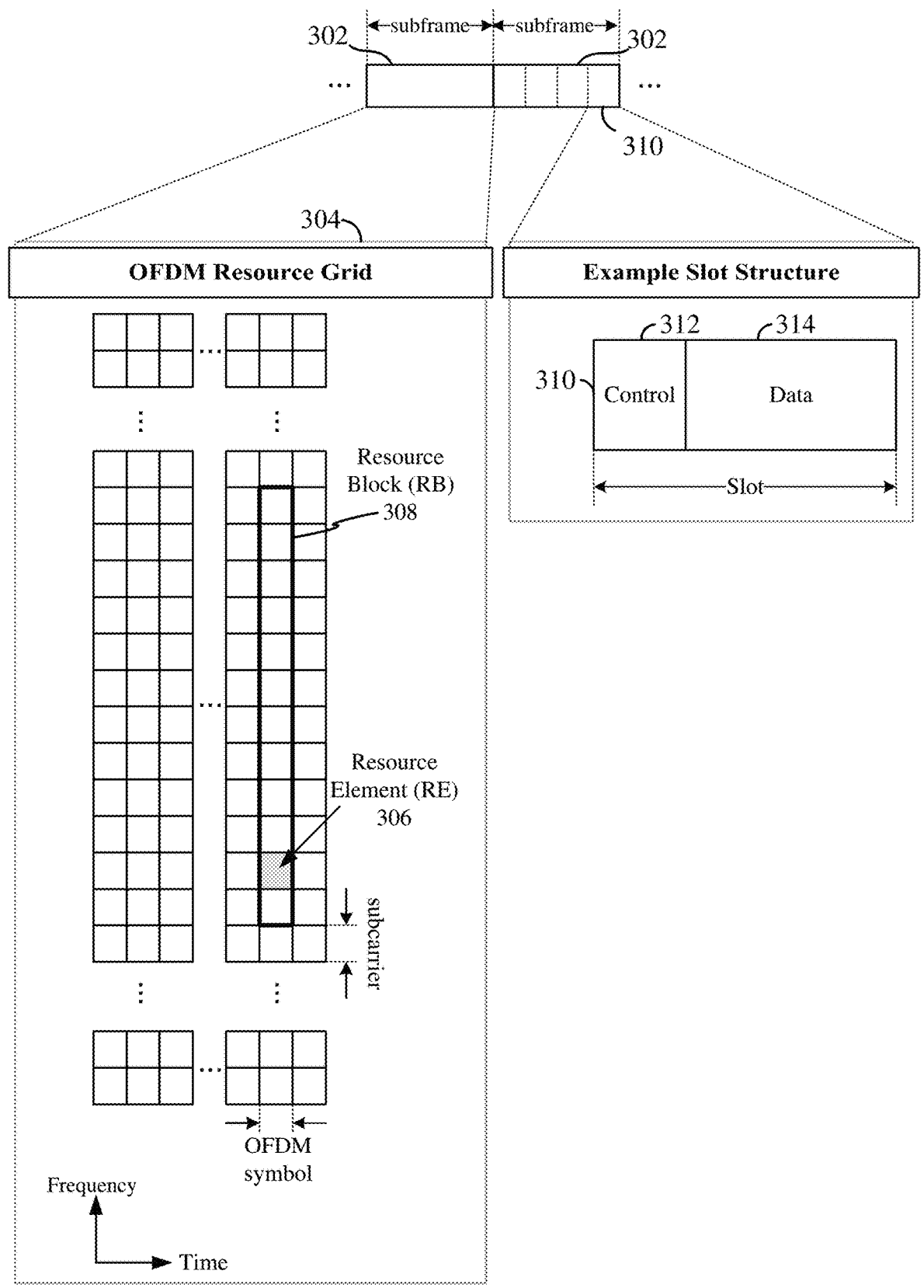
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; an SSS; a TSS, a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
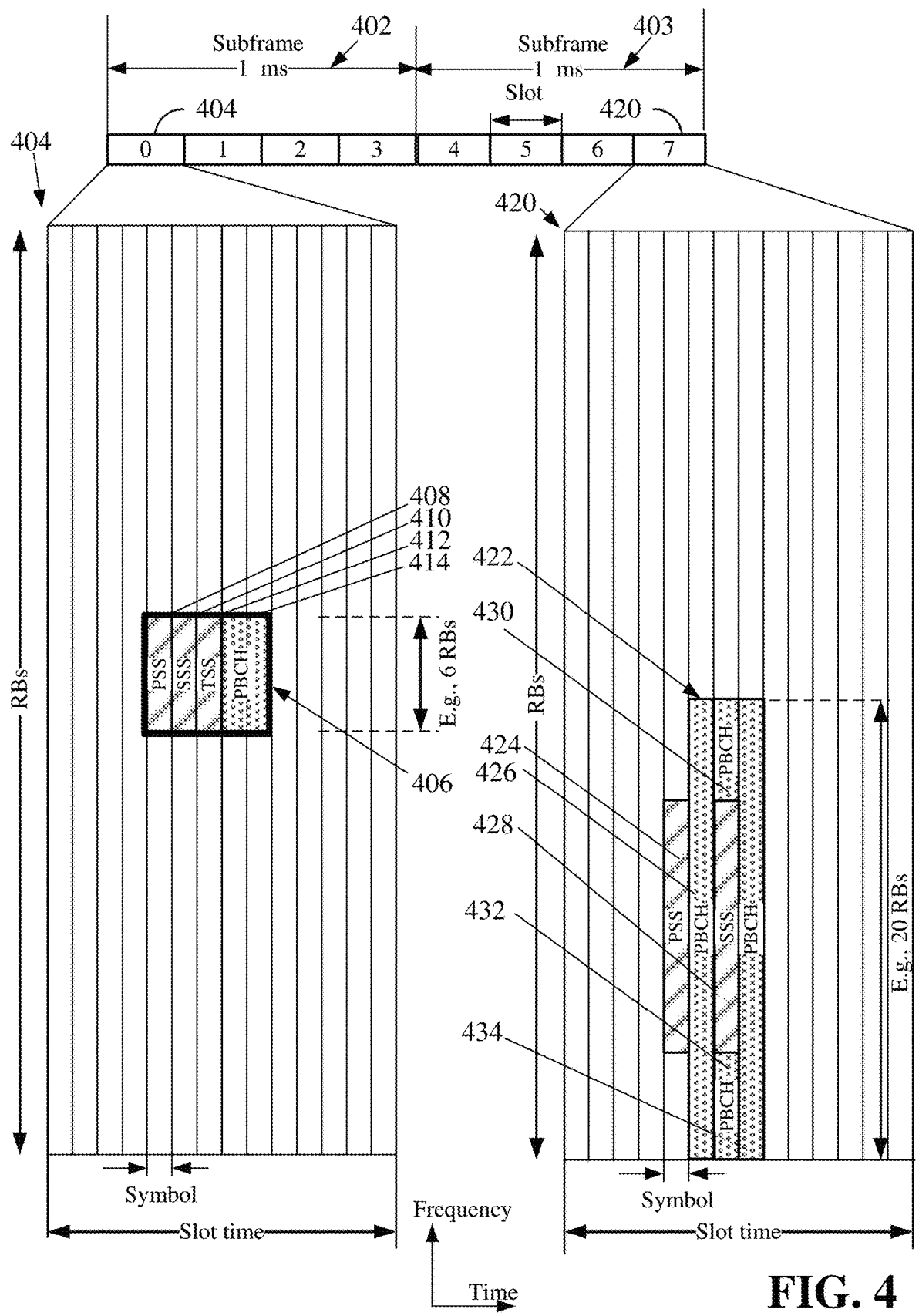
FIG. 4 is a schematic illustration of an exemplary subframe or slot used in a wireless network showing some of the channels that may be carried in a slot or subframe of a particular frame according to some aspects of the present disclosure.

With reference to various wireless networks, such as LTE or NR, wireless communication may utilize frequency division duplexing (FDD) or time division duplexing (TDD). Exemplary DL channels are illustrated in FIG. 4 based on certain representations, which are merely various representations of formats that could be adopted in 5G NR, but is not limited to such. In this illustration, a portion of a radio frame is shown for illustration purposes; namely two 5 ms subframes 402, 403 of the frame, each containing four (4) slots similar to the example of FIG. 3. It is noted that these times are merely exemplary, and the disclosure is not limited to channels having specific timings, and that the disclosure contemplates other slot timings already known or those yet to be developed. Slots 404 and 420 are expanded in this illustration to show additional detail in the time and frequency dimensions of at least two different structures for SSBs to which the present methods and apparatus may be applied. That is, for the purpose of explanation, FIG. 4 illustrates some of the channels that may be carried in slots 404 or 420 according to some aspects of the present disclosure. It is to be understood that these are not all of the channels that might be carried in a given slot, and it is not necessary that all of the described channels below would always appear in such a slot, or that the SSBs would be different within one frame, even though the illustration may suggest such.

In the horizontal direction of the figure, representing the time dimension, the example of slot 404 is subdivided into a number of OFDM symbols (e.g., 14 symbols in the example illustrated) where the exact number of OFDM symbols per slot can vary to some extent based on the configuration of the symbols. The vertical direction represents the frequency dimension. In OFDM, the frequency dimension is subdivided into orthogonal subcarriers, such that the intersection of one subcarrier and one OFDM symbol provides one resource element (RE). REs are grouped into resource blocks (RBs) as discussed before, where each RB may include a predefined number of subcarriers (e.g., 12 subcarriers) within one symbol. The system bandwidth can range from 1 RB to 100 RBs, in one example. This illustration shows an entire system bandwidth for an exemplary carrier, where the given carrier has a system bandwidth greater than 6 RBs.

The illustrated slot 404 includes an SS block or synchronization signal 406, which includes a PSS 408, an SSS 410, a TSS 412 (although this may be optional), and a physical broadcast channel (pBCH) 414. The PSS 408 and SSS 410 may provide for frequency and timing acquisition, including the determination of the carrier frequency and OFDM symbol, subframe, and frame timing. The pBCH 414 carries a master information block (MIB) that may repeat every set number of frames and includes information relating to the overall DL transmission bandwidth, PHICH configuration, and a system frame number (SFN). It is contemplated that in NR networks, the synchronization signal may be used to convey other information such as a Radio Frame Boundary (the location of the first symbol in a radio frame, a Subframe Boundary (the location of the first symbol in a slot, and/or some additional information (e.g., Physical Cell ID, Hypercell ID, System ID, etc.).

The illustrated slot 420 shows within another structure for an SSB 422 that may be utilized in 5G NR. In this example, the SSB 422 includes a PSS 424 occurring in time before at least a portion of the pBCH 426. Additionally, the number of RBs used for the PSS 424 in this example may be 12 RBs, with those at the greatest and least numbering not utilized according to some aspects of SSBs used in 5G NR. The SSS 428 may be interlaced with other portions of the pBCH 430 and 432, and then a remainder of the pBCH transmitted last in time as shown by reference number 434. Of further note, the pBCH transmissions, and the pBCH interlaced with the SSS transmissions may utilize 20 RBs in one example.

Unlike the restrictions placed on the location of the PSS, SSS, and pBCH in LTE networks, in an NR network channels such as these may not necessarily be located in the center of the system bandwidth, and may occupy a wide bandwidth (e.g., as wide as 5 MHz, or any other suitable bandwidth). In fact, the specific bandwidth that carries the PSS/SSS/TSS/pBCH may in some examples be cell-specific (i.e., generally different from one cell to another) or zone-specific (each zone is defined as a set of cells). In addition, in an NR network, unlike an LTE network, control channels such as the PCFICH and PDCCH are expected to be narrowband channels that occupy less than the entire system bandwidth.

In LTE, the pBCH indicates the system bandwidth. Because the control bandwidth in LTE is the same as the system bandwidth, the configuration for the control channel can be known to the UE immediately upon decoding the PBCH. Then the UE can monitor the control channel for further system information in SIB transmissions. In contrast, in NR the control channel could exist in the form of multiple subbands, and as a result, in order for the UE to access the SIB message from one of the control subbands, it derives that control subband location/configuration/bandwidth after PSS/SSS/TSS/PBCH decoding.

Note that there might be more than one control subband, and each control subband can be either common or UE-specific. The common subband may be monitored by all UEs (or at least a group of UEs) to get some broadcast information such as paging/SIB information, which is common to all the UEs (or at least a group of UEs). The UE-specific subband, on the other hand, can be beamformed to serve only a limited number of UEs. Thus, the UE-specific subband may carry only UE-specific control information. The present disclosure provides several ways for the UE to obtain the configuration/bandwidth/allocation of the common control subband(s), from which it can derive more control information such as the system bandwidth, slot configuration, etc.

As an example, the predetermined reference resource location, or reference subband(s), may be the subband(s) where the synchronization sub-channels (e.g., PSS, SSS, TSS, and PBCH) are located. A device may be preconfigured with information about the set of subbands that carries these channels, and accordingly they may provide a consistent reference to determine the subband or subbands that carry the narrowband control channels.

In another example, narrowband control channels may occupy the same subband(s) as the set of subbands as the predetermined reference resource location (e.g., the set of subbands that carries the synchronization sub-channels such as PSS, SSS, TSS, and pBCH). In this example, there is no need to indicate the allocation for the common control subband, since the allocation is already fixed to be the same as that of the PSS, SSS, and PBCH signals. However, because this example would force all of these channels to share the same set of subbands, resources within that set of subbands may become crowded.

As discussed above with reference to FIG. 2, an NR access network may utilize UL-based mobility, where the designs of the PSS/SSS/TSS/PBCH are zone-specific, rather than cell-specific. In these UL-based mobility access networks, cell-specific information such as the physical cell ID (PCI) may be conveyed via some other, separate channel. In this case, the set of subbands that carries the narrowband control channels can be zone-ID specific, although it may be preferable for these control channel locations to be cell-specific. For derivation of cell-specific control channel locations, the set of subbands that carries the narrowband control channels can be based on cell specific information such as the PCI, zone-specific information, or a combination of the cell-specific and zone-specific information. For example, if the PBCH is zone-specific, the indication of the set of subbands that carries the narrowband control channels in the PBCH can be further combined with the PCI to derive cell-specific control subband information for the cell Sync Channel Design Supporting Multiple Waveforms As mentioned before, typically a low PAPR waveform may be desirable for broadcast of the pBCH channel to ensure adequate coverage over a cell. On the other hand, there are situations where OFDM waveforms may have advantages over low PAPR waveforms. Given an example of DFT-S-OFDM as the low PAPR waveform, OFDM provides lower complexity as no DFT spreading is required at a transmitter. It is further noted here, however, that in a full-band scenario, this complexity advantage afforded by OFDM deteriorates since the DFT and Inverse Discrete Fourier Transform (IDFT) cancel out and the transmission actually becomes simpler for DFT-S-OFDM. Another advantage of OFDM over a low PAPR waveform is that a simpler equalizer may be used at a receiver (Note: this applies even in the full band case).

Other situations where OFDM may be advantageous over low PAPR waveforms include that OFDM supports non-contiguous tones. In the particular example of DFT-S-OFDM, it is noted that such a low PAPR waveform can support non-contiguous tones, but in doing so loses the PAPR advantage. Additionally, OFDM provides more flexible and efficient DMRS overhead when compared with known low PAPR waveforms, such as DFT-S-OFDM, which can provide some flexibility of DMRS overhead but at the cost of higher complexity.

Yet further advantages that OFDM can engender over low PAPR waveforms is that it is easier to frequency division multiplex (FDM) other data. While DFT-S-OFDM may be able to this, in doing so the PAPR advantage would be lost. Of further note, regardless of the type waveform, frequency division multiplexing other data can take power away from a synchronization signal (and the pBCH) and, thus, limits coverage distance. This disadvantage may be ameliorated, however, in situations where there is an imposed maximum power spectral density (PSD) constraint (regulatory or otherwise) in addition to a maximum total power constraint. Thus, in such case the power of other frequency division multiplexed data could not all be transferred to such data away from the synchronization signal.

As may be appreciated from the above discussion, there are situations where it may be more advantageous to utilize low PAPR waveforms for the synchronization signal and pBCH to ensure coverage, whereas other situations may benefit more from the use of OFDM waveforms to reduce complexity and afford flexibility. Accordingly, a synchronization signal design is proposed herein where particular synch slots may utilize low-PAPR waveforms to ensure coverage, and some other particular synch slots use OFDM to achieve lower complexity and higher flexibility advantages. In a particular aspect, the type of waveform for the pBCH may be selectively applied at a particular slot, where a first slot or synchronization signal transmission may utilize a pBCH with an OFDM waveform, for example, and a subsequent slot or sync channel transmission may utilize a pBCH with a low PAPR waveform such as DFT-S-OFDM.

Figure 5:
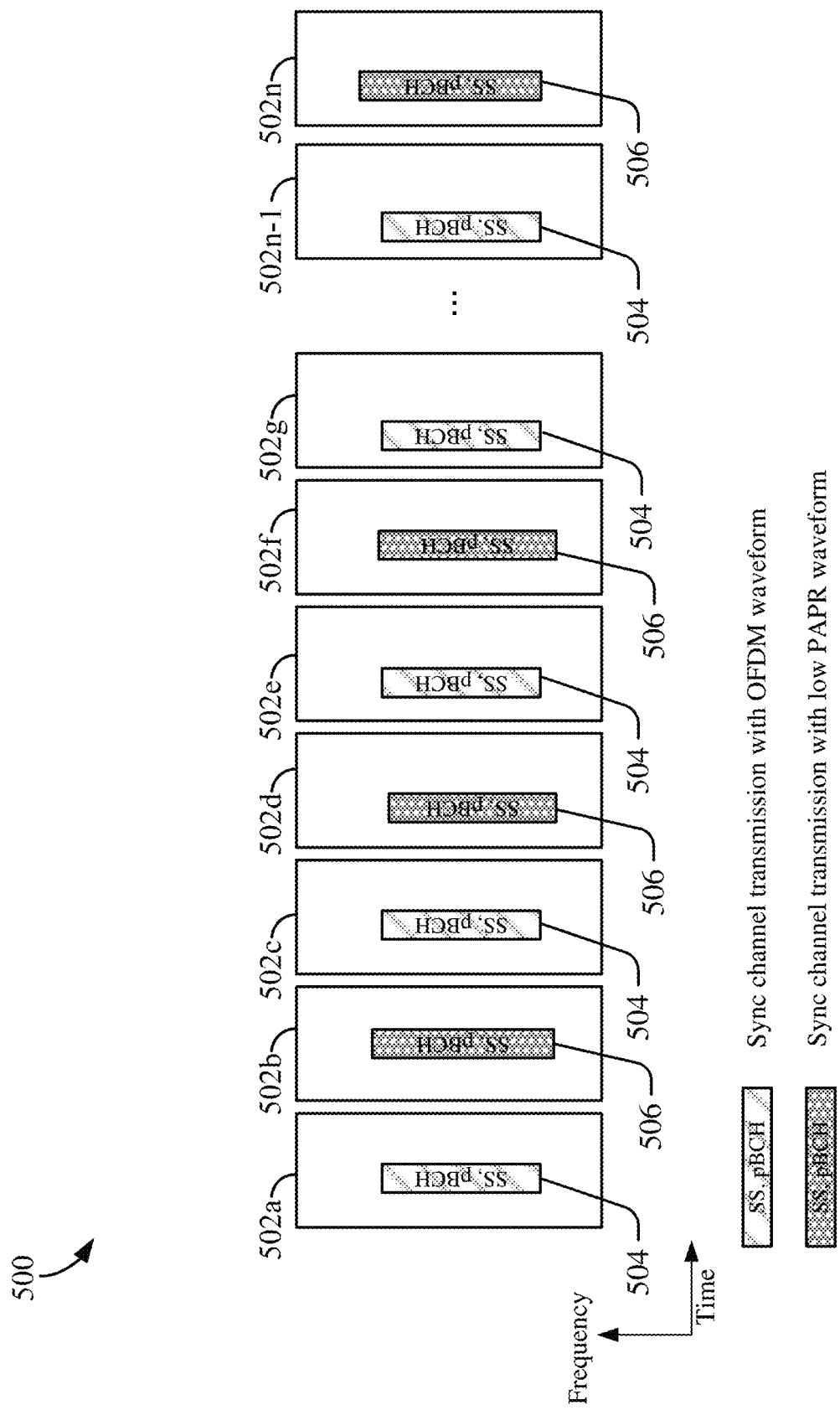
FIG. 5 illustrates an example of synchronizing channel transmission according to aspects of the present disclosure.

FIG. 5 illustrates one example 500 showing the use of OFDM waveforms for every other synchronization signal transmission alternating with a low PAPR waveform transmission for an n number or series of slots (or subframes or even frames) 502a-502n. As illustrated, a first slot 502a includes a synchronization signal transmission 504 using an OFDM waveform, and a next slot 502b includes a synchronization signal transmission 506 using a low PAPR waveform, such as a DFT-S-OFDM waveform. It will be appreciated, however, that the number of the same waveform may be transmitted for the synchronization signal for a number of consecutive slots and that the alternating scheme in FIG. 5 is not limiting as will be explained later in further examples. Furthermore, the initial use of the OFDM waveform 504 in slot 502a is merely arbitrary for purposes of illustration and the sequence may instead start with a low PAPR waveform.

It is further noted that the use of such alternating patterns of OFDM and low PAPR waveforms may increase the initial search complexity at the UE, and increase the acquisition time for cell edge UEs that can only receive the low PAPR transmissions. However, this may be acceptable, for example, during certain times when latency-sensitive traffic is not as frequent in a RAN cell. This example may also add additional downlink capacity, but this is at the expense of search complexity and acquisition time.

Figure 6:
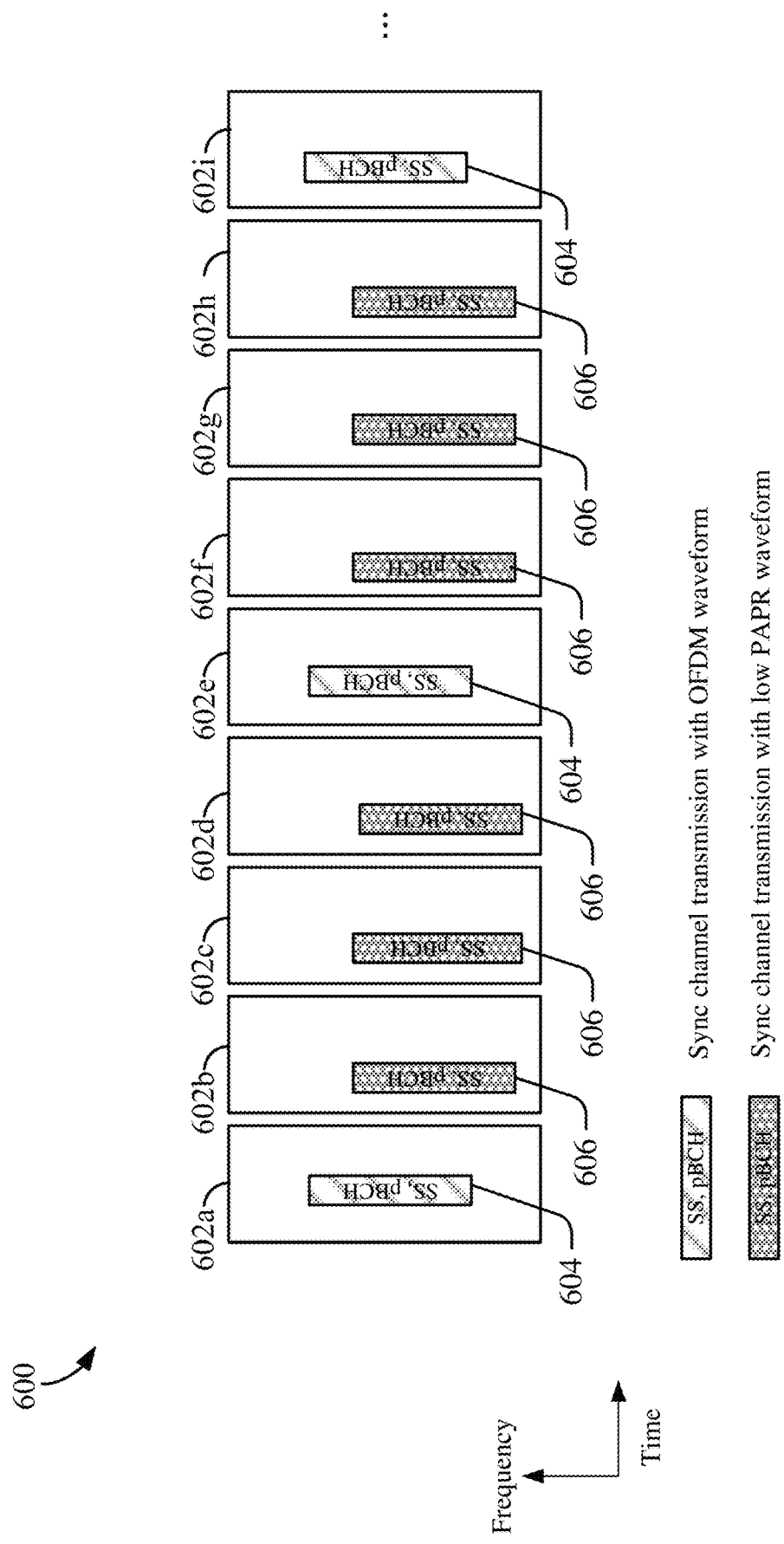
FIG. 6 illustrates another example of synchronizing channel transmission according to aspects of the present disclosure.

As another exemplary illustration 600 of the above concept, FIG. 6 illustrates an example where a particular waveform may be transmitted at a predetermined periodicity with the remaining intervening slots using another waveform to establish a fixed pattern in time. For example, FIG. 6 illustrates an example where every set number (or $n^{th}$ number) of slot transmissions 602 utilizes an OFDM waveform (e.g., slots 602a, 602e, 602i), and the intervening or remaining slots utilize a low PAPR waveform (e.g., 602b-602d and 602f-602h), such as DFT-S-OFDM. The illustrated example in FIG. 6, in particular, has the set number of slots set at four (4) slots where every $4^{th}$ slot uses an OFDM waveform. This number of slots may be greater or less (e.g., every $2^{nd}$ or $3^{rd}$ slot). Additionally, the particular types of waveforms illustrated in FIG. 6 are merely exemplary, and the periodic waveforms could be low PAPR waveforms and the intervening waveforms OFDM, for example.

Figure 7:
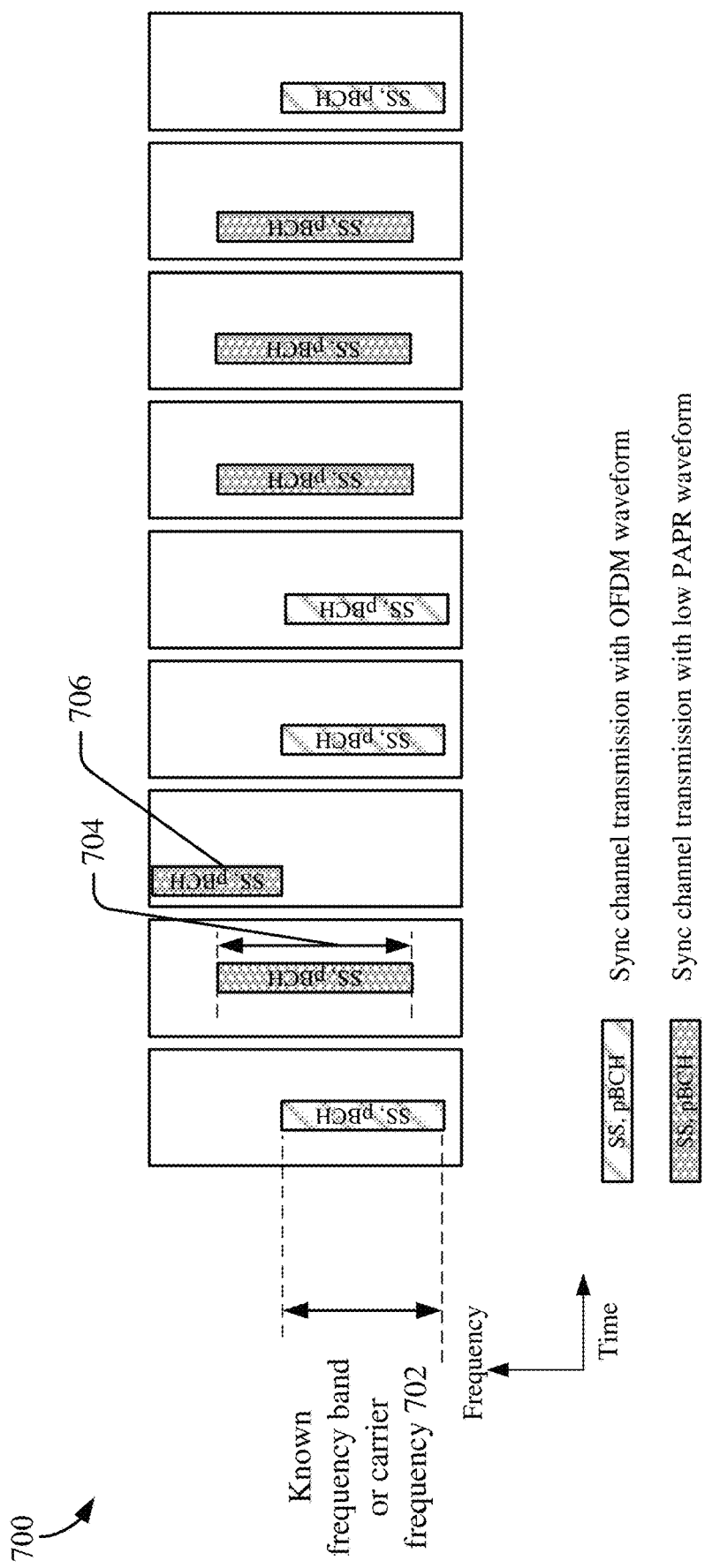
FIG. 7 illustrates still another example of synchronizing channel transmission according to aspects of the present disclosure.

In a further aspect, FIG. 7 illustrates that the present methods and apparatus may further employ methodology or means for indicating the type of waveform being used for the pBCH to the UE, for example. In a first example, the particular RF frequency band or carrier frequency may be used as signaling or an indication of the waveform type. That is, the particular frequency band or carrier frequency, or system bandwidth corresponding to a respective waveform type may be known a priori to the UE performing initial acquisition. As used here, the term "frequency band" may refer to a broad band such as the 41 GHz band or the 52 GHz band, as examples, and then the system bandwidth (e.g., a number of resource blocks), such as 20 MHz or 100 MHz, as examples, will reside or be contained within these frequency bands.

An example of a type of signaling is illustrated in FIG. 7 where a known system frequency bandwidth 702 is used to communicate or indicate an OFDM waveform, and allows a receiver to differentiate whether the SSB is an OFDM or low PAPR waveform. Alternatively, the frequency band may be set for the low PAPR waveform instead to communicate the waveform type, or both OFDM and low PAPR waveforms may have set bandwidth or carrier frequencies that communicate the waveform type to a receiver.

Furthermore, the width or range of system frequency bandwidth 702 for indicating the OFDM waveform may overlap with the range or frequency of a frequency bandwidth 704 used to indicate a low PAPR waveform in one example. Thus, the absolute range or bandwidth would be used as an indicator of the type of waveform. In another aspect, the system frequency bandwidth may be configured such they do not overlap, such as illustrated by SSB 706, which is located in another frequency band that does not overlap with frequency band 702.

In another example, not illustrated in FIG. 7, an SSB that is resident within a particular frequency band (e.g., 41 GHz band) may be known to use one waveform type, while an SSB resident within another frequency band (e.g., 52 GHz band) will be known to use another waveform type. In still another aspect, even if an SSB is transmitted within a given frequency band, a UE may then be configured to search for possible locations of the SSB on a predefined grid of frequencies, typical termed the synch-raster. It is also possible that different points on the synch-raster may correspond to different waveform types, and could have different SSB periodicities.

In other aspects, a means or methodology for indicating the type of waveform could include signaling within the PSS/SSS/TSS, which are indeed parts of that synchronization signal that will be received and processed in time prior to processing of the pBCH as may be deduced from the example of FIG. 4, for example. Thus, the signaling in the at least the PSS, as well as SSS, may be processed first, thereby allowing the receiver to know the type of waveform (i.e., OFDM or low PAPR waveform) prior to actually processing the pBCH.

Figure 8:
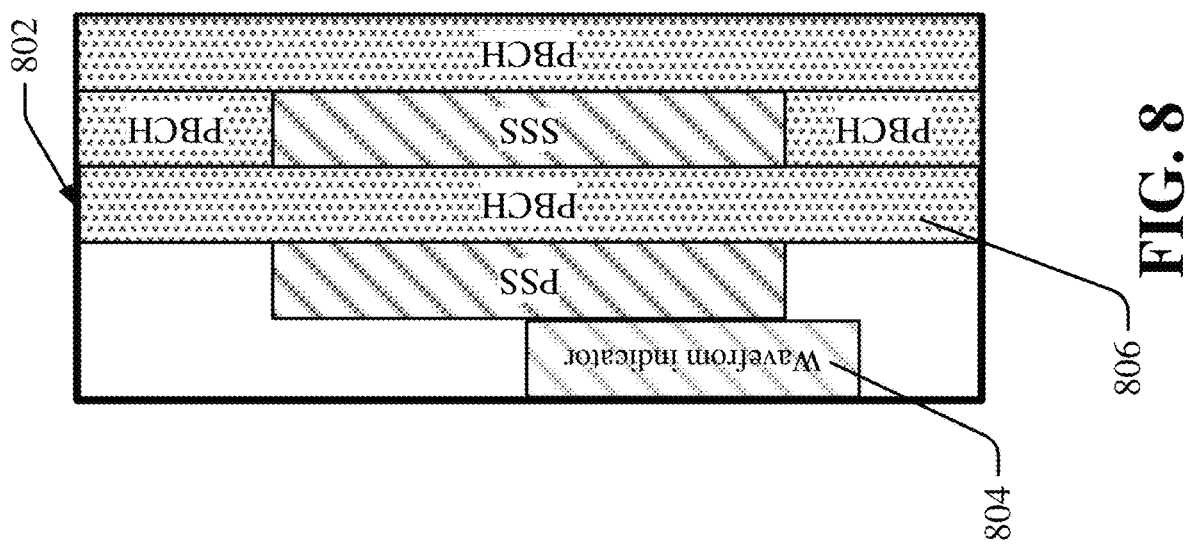
FIG. 8 illustrates a further example of a synchronizing channel utilizing a field for indicating a waveform type utilized for the channel.

FIG. 8 illustrates yet a further implementation for signaling the waveform type. In this example, a further new constituent waveform indication field or portion is introduced into the synchronization signal block SSB 802, where this field or portion would be processed prior to processing of the pBCH. In the illustrated example, a waveform indicator field 804 configured for indicating the pBCH type is placed within the SSB 802, prior in time to the first occurrence of the pBCH 806 in the SSB 802, for example, but not necessarily limited to such. Thus, when SSB 802 is received at a receiver, the receiver may process the field 804 to determine which type of waveform is being used. It is noted, however, that this addition into the synchronization signal block may increase the number of search hypotheses used for processing these other channels. Of further note, the PSS and SSS comprise particular sequences. The information they carry is based on which sequence is used (i.e., the sequence index). Thus, the PSS or SSS could also be used to indicate information about the pBCH waveform, although this may involve optionally increasing the existing index space and partitioning wherein some sequences correspond to one pBCH type waveform, and others to other pBCH waveforms.

Figure 9:
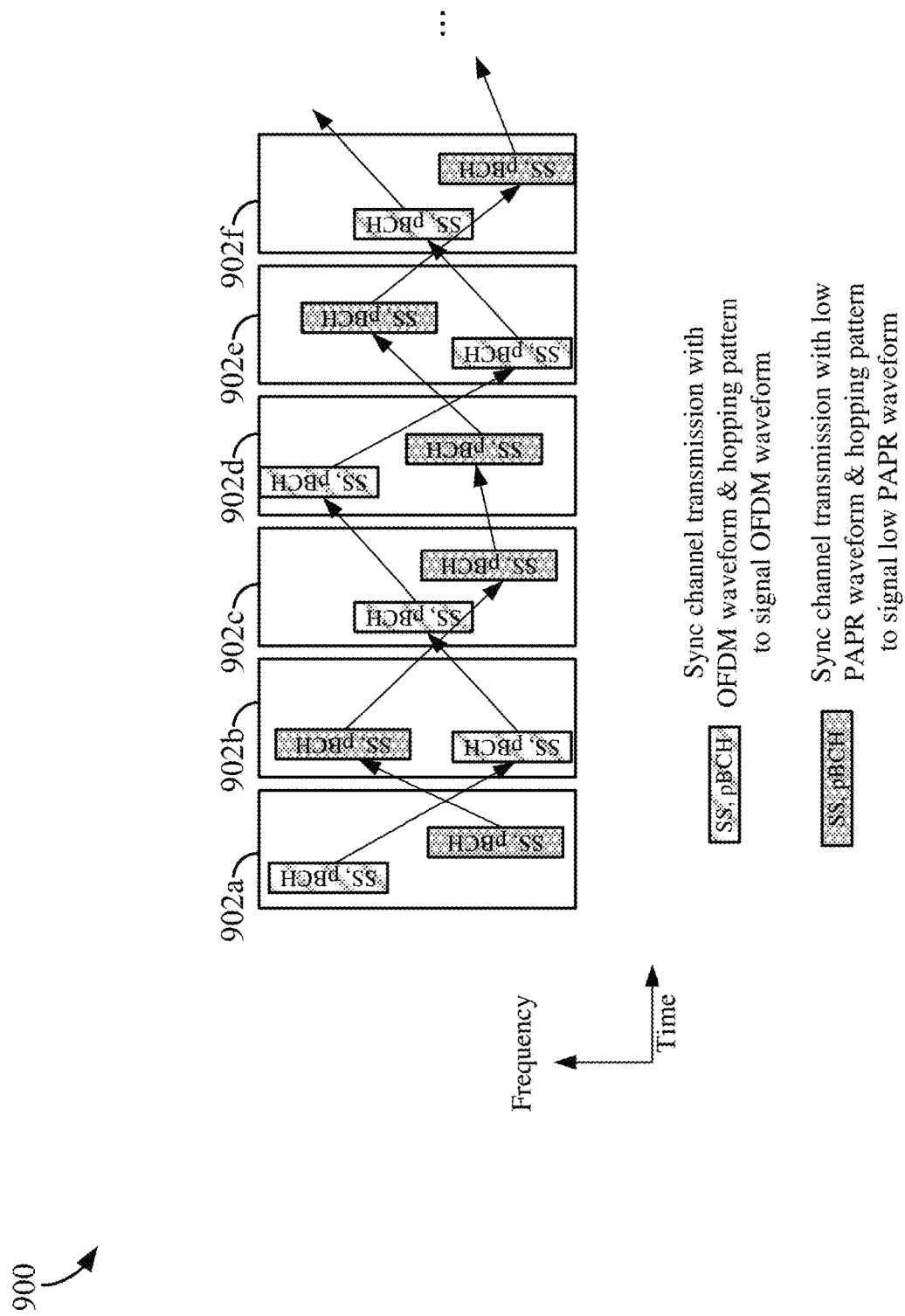
FIG. 9 illustrates yet another example of synchronizing channel transmission according to aspects of the present disclosure.

FIG. 9 illustrates another example of synchronization signal block transmission 900 including methodology or means for indicating the type of waveform being used for the synchronization signal block. In this example, an exact predetermined synchronization signal frequency location is set within the system bandwidth for the channel. For example, the OFDM synchronization signal could be located in the system bandwidth across resource blocks 78-84, whereas the low PAPR synchronization signal could be located across the system bandwidth represented by resource blocks 36-42. In a further aspect of this example, the synchronization signal block and pBCH design could involve frequency-hopping within the system bandwidth across multiple time-instances of synchronization signal transmission. In this example, the frequency-hopping may include a predetermined or predefined hopping pattern within the system bandwidth across multiple time-instances of synchronization signal transmission as illustrated in the example of FIG. 9. The hopping pattern may be different for OFDM waveform transmissions in contrast to the hopping pattern for transmissions with a low PAPR waveform as may be seen in FIG. 9. In addition to frequency diversity, the timing of the synchronization signal within each slot may be diversified as well, as may be also seen in the example of FIG. 9. Such frequency hopping would provide both frequency and time diversity to the synchronization signal, but this might be at the expense of causing a higher initial search complexity. It is also noted that even if a hopping pattern is predefined, some additional search hypotheses might be required to determine position/timing within the pattern. It is yet further noted that the means for indication may include that certain frequencies in the hop pattern are associated with certain waveforms (e.g., either OFDM or low PAPR waveforms). Some may be associated with multiple waveforms among which the one in use is signaled using the other methods described herein.

As yet another way for indicating the type of waveform, it is also contemplated that no positive indication is provided. In such case, the UE would be configured to always try multiple waveform hypotheses. This method, however, would add further complexity to the UE to execute the increased multiple waveform hypotheses.

As discussed earlier, in the case where an OFDM waveform is used, additional data may be frequency division multiplexed with such waveforms. In the present case of selection between OFDM and low PAPR waveforms, it is further contemplated that a pBCH waveform indication could also implicitly carry other information. For example, additional data may be frequency division multiplexed with the pBCH only if pBCH uses OFDM waveform.

Figure 10:
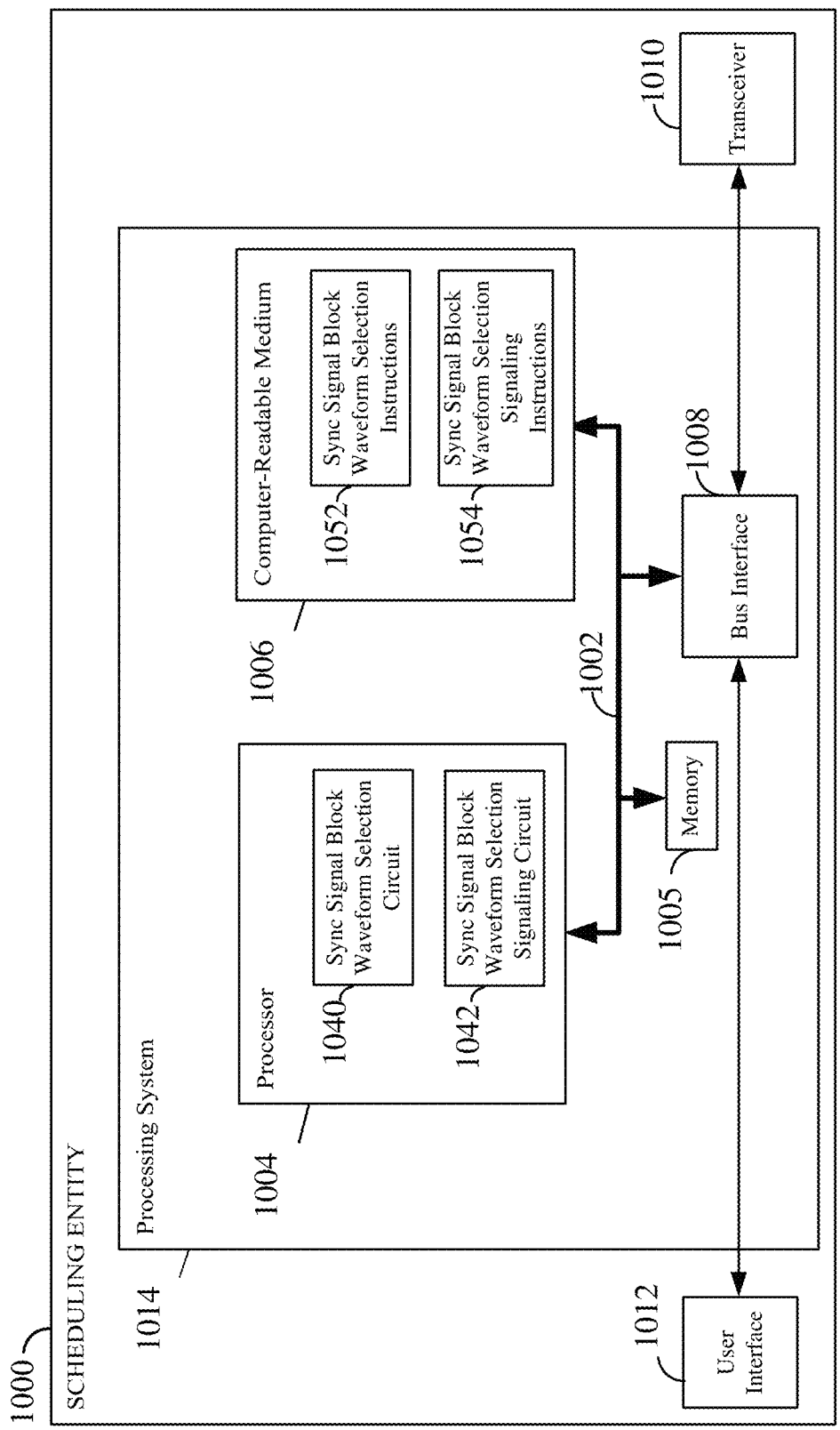
FIG. 10 is a block diagram illustrating an example of a hardware implementation for an apparatus employing a processing system in a scheduling entity.

FIG. 10 is a block diagram illustrating an example of a hardware implementation for a scheduling entity 1000 employing a processing system 1014. For example, the scheduling entity 1000 may be a user equipment (UE) as illustrated in any one or more of FIGS. 1 and 2. In another example, the scheduling entity 1000 may be a base station as illustrated in any one or more of FIGS. 1 and 2.

The scheduling entity 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1000 may be configured to perform any one or more of the functions described herein. That is, the processor 1004, as utilized in a scheduling entity 1000, may be used to implement any one or more of the processes and procedures described herein or illustrated in FIG. 11.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, display, speaker, microphone, joystick) may also be provided.

In some aspects of the disclosure, the processor 1004 may include circuitry 1040 configured for various functions, including, for example, selecting or determining a waveform for each particular sync channel transmission for each slot. For example, the circuitry 1040 may be configured to implement one or more of the functions described herein in relation to FIGS. 3-9, as well as FIG. 12 including, for example, the functions of blocks 1202-1206. Processor 1004 may also include circuitry 1042 configured for signaling or indicating to a receiver (e.g., a receiver in a UE or Scheduled Entity) which waveform is used for a particular sync channel transmission as discussed above and in connection with FIGS. 6-8.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1006 may include software 1052 configured for various functions, including, for example sync channel waveform selection instructions. For example, the software 1052 may be configured to implement one or more of the functions described above in relation to FIGS. 4-8 and FIG. 12, including, e.g., blocks 1202-1206. Furthermore, medium 1006 may include sync channel waveform selection signaling instructions 1054 to cause the processor 1004 to signal the type of waveform to a receiver in UE, for example.

Figure 11:
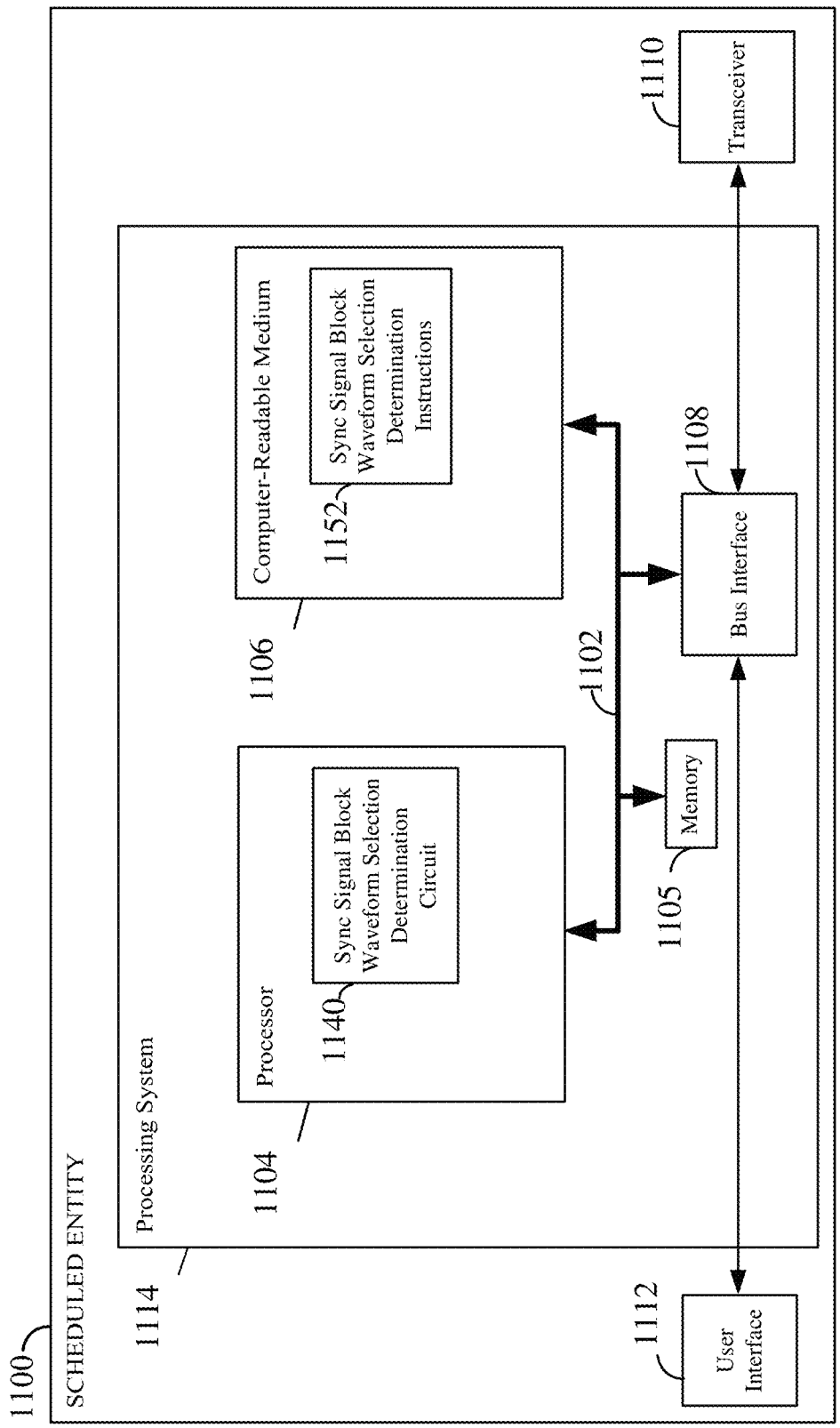
FIG. 11 is a block diagram illustrating an example of a hardware implementation for an apparatus employing a processing system in a scheduled entity.

FIG. 11 is a conceptual diagram illustrating an example of a hardware implementation for an exemplary scheduled entity 1100 employing a processing system 1114. In accordance with various aspects of the disclosure, an element, or any portion of an element, or any combination of elements may be implemented with the processing system 1114 that includes one or more processors 1104. For example, the scheduled entity 1100 may be a user equipment (UE) as illustrated in any one or more of FIGS. 1 and 2.

The processing system 1114 may be substantially the same as the processing system 1014 illustrated in FIG. 10, including a bus interface 1108, a bus 1102, memory 1105, a processor 1104, and a computer-readable medium 1106. Furthermore, the scheduled entity 1100 may include a user interface 1112 and a transceiver 1110 substantially similar to those described above in FIG. 10. That is, the processor 1104, as utilized in a scheduled entity 1100, may be used to implement any one or more of the processes described below and illustrated in FIG. 12.

In some aspects of the disclosure, the processor 1104 may include circuitry 1140 configured for various functions, including, for example, determining the waveform of sync channel based on signaling or indication information configured according to any of the examples given above. Additionally, medium 1106 include instructions or code 1152 for causing synchronization signal waveform selection determination by the processor 1104, as one example, including determination based on receiving any of the signaling/indications discussed herein.

Figure 12:
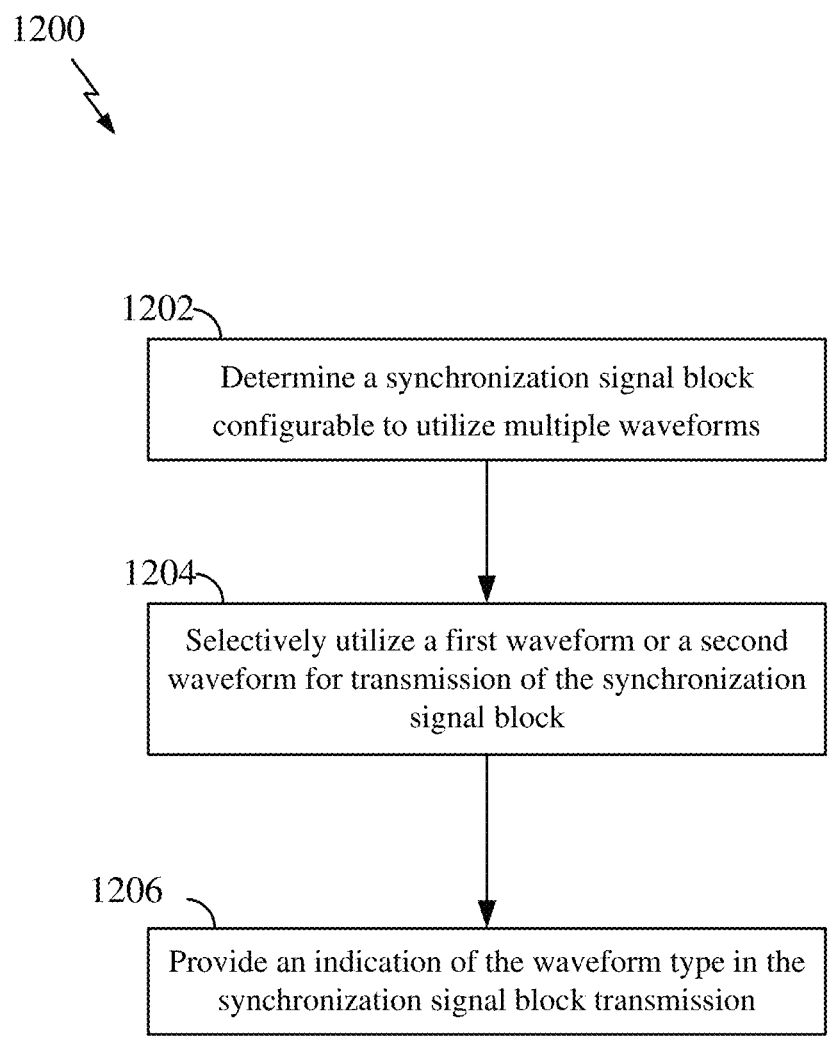
FIG. 12 illustrates a flow diagram of an exemplary method according to aspects of the present disclosure.

FIG. 12 is a flow chart illustrating an exemplary process 1200 for providing multiple waveforms for transmission of a synchronization signal block in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 1000 illustrated in FIG. 10. In some examples, the process 1200 may be carried out by any suitable apparatus or means for carrying out the functions or algorithm described below.

At block 1202, method 1200 includes determining within a transceiver a synchronization signal block that is configurable for transmission using at least one of a first waveform type, such as OFDM, and a second waveform type, such as a low PAPR waveform. Furthermore, method 1200 includes transmitting the synchronization signal block through selectively using first waveform and the second waveform for transmission of the synchronization signal block as shown in block 1204. According to certain aspects, transmission of the synchronization signal block or, alternatively, synchronization signal block burst-sets, is performed through alternating transmissions using the first waveform and the second waveform, such as was illustrated in FIG. 5, for example. It is also noted here that while the present description is generally described in the context of synchronization signal blocks (SSBs), the present methods and apparatus are applicable to synchronization signal burst-sets as well as mentioned above. A synchronization signal burst-set is a set of sequentially occurring SS blocks, indexed by a block index within the burst-set, where each index corresponds to a different beam direction. In the context of the present application, each block-index may be associated with a fixed pattern of waveform choice across the burst-sets, but this pattern itself may be different for different block-indices. The burst-set may then repeated at a burst-set periodicity. In further aspects, the methods and apparatus may include certain block-indices within each burst-set using one waveform while others use another waveform. In still another aspect, blocks in any given burst-set may use the same waveform, but this waveform could be configured to change in a fixed pattern across burst-sets.

In other aspects, the transmission of the synchronization signal or synchronization signal block burst-sets may include selectively utilizing the first waveform or the second waveform at a predetermined periodicity for synchronization signal block or synchronization signal block burst-set transmissions and utilizing the other one of the first or second waveform for one or more synchronization signal block or synchronization signal block burst-set transmissions during time periods between the transmissions using the other of the first or second waveform, such as was discussed in connection with FIG. 6 herein.

Similarly, method 1200 may include transmitting the synchronization signal block using a fixed pattern in time of transmissions of the first waveform or the second waveform, again as shown in FIG. 6 as one example. Furthermore, the method 1200 may include embodiments where the fixed pattern in time includes transmission of every $n^{th}$ synchronization signal block transmission using a first waveform type or the second waveform type, and a remainder of the synchronization signal block transmissions in the interim periods use the other type of waveform, as may be seen in FIG. 6 as one example.

As further illustrated in FIG. 12, method 1200 also may include indicating within the transmission of the synchronization signal block the type of waveform being selectively used for transmission of at least a portion of the synchronization signal block over time, as shown at block 1206. In an aspect, the process of block 1206 may be effectuated in conjunction with the processes of blocks 1202 or 1204, where the transmission patterns or location of the synchronization signal block within slots and frames are configured to communicate the waveform type. In an aspect, the indication of the type of waveform includes transmitting the synchronization signal block using predefined RF frequency bands, carrier frequencies, or system bandwidths that are correlated to a waveform type. An example of this indication was discussed in connection with FIG. 7, where a frequency band indicates either the OFDM or low PAPR waveforms.

In yet further aspects, indicating the type of waveform may include placing the synchronization signal block in a predetermined location having at least one of time or frequency location within a transmission slot locations that correlate to a particular waveform type. Still further, the type of waveform may be indicated using a predefined frequency-hopping pattern within a system bandwidth across multiple time-instances of the synchronization signal block transmission that correlate to a particular waveform type, such as was discussed herein in connection with FIG. 9.

Figure 13:
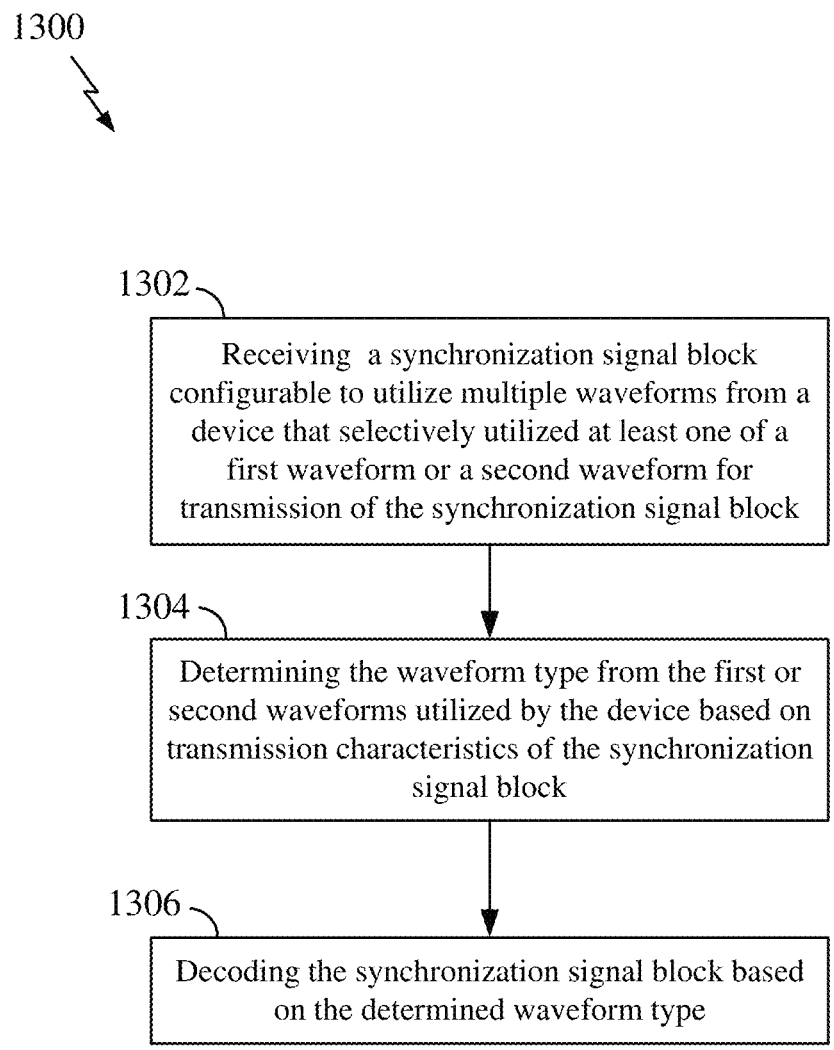
FIG. 13 illustrates a flow diagram of another exemplary method according to aspects of the present disclosure.

FIG. 13 illustrates yet another method 1300 that may be implemented in a UE or scheduled entity according to aspects of the present disclosure. In particular, method 1300 includes receiving a synchronization signal block (or synchronization signal burst-set) that is transmitted from a device such as a base station or gNB using at least one of a first waveform or a second waveform, where the device selectively used the first waveform or the second waveform for transmission of the synchronization signal block or synchronization signal burst-set as shown in block 1302. Method 1300 further includes determining within a UE, for example, the type of waveform being selectively used for transmission of at least a portion of the synchronization signal block or synchronization signal burst-set based on a characteristic of the transmission of the synchronization signal block or synchronization signal burst-set as shown in block 1304. It is noted that the characteristic may include any one of the various methods disclosed herein for indicating the type of waveform such as a fixed pattern, frequency bands, etc., as shown in the various examples of FIGS. 5-9.

Method 1300 further includes decoding the synchronization signal block or synchronization signal burst-set based on the determined waveform type as shown in block 1306. Concerning decoding of an SSB, it should be appreciated that an SSB includes some signals that are detected, such as the PSS and SSS, and others that are actually decoded, such as the pBCH. Furthermore, typically in a receiver, it is sufficient to decode the pBCH from just one of the SS blocks, although multiple blocks may be detected, such as in the case where a UE might attempt to decode the pBCH only on a strongest detected block in one example.

Several aspects of a wireless communication network have been presented with reference to exemplary implementations. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated in herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   determining at least first and second synchronization signal blocks that are each configurable for transmission using at least one of a first waveform or a second waveform;
   selecting one of the first waveform or the second waveform for transmission of the first synchronization signal block;
   selecting the other of the first waveform or the second waveform for transmission of the second synchronization signal block;
   transmitting via a transceiver the first and second synchronization signal blocks using the respectively selected first waveform or second waveform; and
   indicating through a transmission characteristic of the transmission of the first or second synchronization signal block which of the first or second waveform is being selectively used for transmission of at least a portion of the first or second synchronization signal block over time;
   wherein one of the first or second waveforms includes an orthogonal frequency division multiplexed (OFDM) waveform, and the other of the first or second waveforms includes a low peak to average power ratio (PAPR) waveform having a PAPR less than the OFDM waveform.

2. The method of claim 1, wherein the low peak to average power ratio (PAPR) waveform utilizes at least one of DFT-spread OFDM (DFT-S-OFDM), interleaved DFT-spread OFDM (IFDM), or direct time-domain modulation.

3. The method of claim 1, further comprising:
   transmitting the first and second synchronization signal blocks or a synchronization signal burst-set using a fixed pattern in time of transmissions of the first or second waveforms.

4. The method of claim 3, wherein transmitting the first and second synchronization signal blocks or the synchronization signal burst-set using the fixed pattern in time further comprises:
   transmitting the first or second synchronization signal blocks or the synchronization signal burst-set with the first waveform every $n^{th}$ transmission; and
   transmitting the other of the first or second synchronization signal blocks or synchronization signal burst-set transmissions in interim periods with the second waveform.

5. The method of claim 1, wherein the transmission characteristic includes transmitting at least one of the first or second synchronization block using at least one of predefined RF frequency bands, carrier frequencies or system bandwidths that correlate to one of the first or second waveform.

6. The method of claim 1, wherein the transmission characteristic includes placing at least one of the first or second synchronization signal block in a predetermined location having at least one of time or frequency location within transmission slot locations that correlate to one of the first or second waveform.

7. The method of claim 1, wherein the transmission characteristic includes using a predefined frequency-hopping pattern within a system bandwidth across multiple time-instances of the first or second synchronization signal block transmissions that correlate to one of the first or second waveform.

8. The method of claim 1, wherein the first or second synchronization signal block includes a physical broadcast channel (pBCH).

9. The method of claim 1, wherein selection of one of the first waveform or the second waveform for transmission of at least one of the first and second synchronization signal blocks is applied for a particular synchronization slot during the transmission.

10. An apparatus for wireless communication, comprising:
    means for determining at least first and second synchronization signal blocks that are each configurable for transmission using at least one of a first waveform or a second waveform;
    means for selecting one of the first waveform or the second waveform for transmission of the first synchronization signal block;
    means for selecting the other of the first waveform or the second waveform for transmission of the second synchronization signal block;
    means for transmitting via a transceiver the first and second synchronization signal blocks using the respectively selected first waveform or second waveform; and
    means for indicating through a transmission characteristic of the transmission of the first or second synchronization signal block which of the first or second waveform is being selectively used for transmission of at least a portion of the first or second synchronization signal block over time;
    wherein one of the first or second waveforms includes an orthogonal frequency division multiplexed (OFDM) waveform, and the other of the first or second waveforms includes a low peak to average power ratio (PAPR) waveform having a PAPR less than the OFDM waveform.

11. The apparatus of claim 10, wherein the low peak to average power ratio (PAPR) waveform utilizes at least one of DFT-spread OFDM (DFT-S-OFDM), interleaved DFT-spread OFDM (IFDM), or direct time-domain modulation.

12. The apparatus of claim 10, further comprising:
    means for transmitting the first or second synchronization signal blocks or a synchronization signal burst-set using a fixed pattern in time of transmissions of the first or second waveforms.

13. The apparatus of claim 12, wherein the means for transmitting the first or second synchronization signal blocks or synchronization signal burst-set using the fixed pattern in time of transmissions of the first or second waveform further comprises:
    means for transmitting the first or second synchronization signal blocks or the synchronization signal burst-set with the first waveform every $n^{th}$ transmission; and
    means for transmitting the other of the first or second synchronization signal block or synchronization signal burst-set signal transmissions in interim periods with the second waveform.

14. The apparatus of claim 10, wherein the means for indicating a type of waveform through the transmission characteristic includes one of:
   means for transmitting the first or second synchronization signal block using at least one of predefined RF frequency bands, carrier frequencies or system bandwidths that correlate to one of the first or second waveform;
   means for placing the first or second synchronization signal block in a predetermined location having at least one of time or frequency location within transmission slot locations that correlate to one of the first or second waveform; or
   means for providing a predefined frequency-hopping pattern within a system bandwidth across multiple time-instances of the first or second synchronization signal block transmissions that correlate to one of the first or second waveform.

15. The apparatus of claim 10, wherein the means for selecting one of the first waveform or the second waveform for transmission of at least one of the first and second synchronization signal blocks is configured to apply selection for a particular synchronization slot during the transmission.

16. A non-transitory computer-readable medium storing computer-executable code, comprising code for causing a computer to:
   determine at least first and second synchronization signal blocks that are each configurable for transmission using at least one of a first waveform or a second waveform;
   select one of the first waveform or the second waveform for transmission of the first synchronization signal block;
   select the other of the first waveform or the second waveform for transmission of the second synchronization signal block;
   transmit via a transceiver the first and second synchronization signal blocks using the respectively selected first waveform or second waveform; and
   indicate through a transmission characteristic of the transmission of the first or second synchronization signal block which of the first or second waveform is being selectively used for transmission of at least a portion of the first or second synchronization signal block over time;
   wherein one of the first or second waveforms includes an orthogonal frequency division multiplexed (OFDM) waveform, and the other of the first or second waveforms includes a low peak to average power ratio (PAPR) waveform having a PAPR less than the OFDM waveform.

17. The non-transitory computer-readable medium of claim 16, wherein the low peak to average power ratio (PAPR) waveform utilizes at least one of DFT-spread OFDM (DFT-S-OFDM), interleaved DFT-spread OFDM (IFDM), or direct time-domain modulation.

18. The non-transitory computer-readable medium of claim 16, further comprising code for causing the computer to:
   transmit the first or second synchronization signal block or a synchronization signal burst-set using a fixed pattern in time of transmissions of the first or second waveform.

19. The non-transitory computer-readable medium of claim 18, further comprising code for causing the computer to:
   transmit one of the first or second synchronization signal blocks or the synchronization signal burst-set with the first waveform every $n^{th}$ transmission; and
   transmit a remainder of the first or second synchronization signal blocks or synchronization signal burst-set transmissions in interim periods with the second waveform.

20. The non-transitory computer-readable medium of claim 16, wherein the code for causing the computer to indicate the first or second waveform through the transmission characteristic further comprises code for causing the computer to one of:
   use at least one of predefined RF frequency bands, carrier frequencies or system bandwidths that are correlated to a waveform type;
   place the first or second synchronization signal block in a predetermined location having at least one of time or frequency location within transmission slot locations that correlate one of the first or second waveform; or
   provide a predefined frequency-hopping pattern within a system bandwidth across multiple time-instances of the synchronization signal block transmission that correlate to one of the first or second waveform.

21. The non-transitory computer-readable medium of claim 16, wherein the code for causing the computer to select one of the first waveform or the second waveform for transmission of the first and second synchronization signal blocks further includes code to select a particular synchronization slot for transmission of at least one of the first and second synchronization signal blocks during the transmission.

22. An apparatus for wireless communication, comprising:
   a processor;
   a transceiver communicatively coupled to the processor; and
   a memory communicatively coupled to the processor,
   wherein the processor is configured to:
      receive a first synchronization signal block or synchronization signal burst-set that is transmitted from a base station using at least one of a first waveform or a second waveform, where the transmission of the first synchronization signal block or synchronization signal burst-set includes selecting one of the first waveform or the second waveform for transmission of the first synchronization signal block or synchronization signal burst-set;
      receive a second synchronization signal block or synchronization signal burst-set that is transmitted from the base station using at least the other of the first waveform or the second waveform, where the transmission of the second synchronization signal block or synchronization signal burst-set includes selecting the other of the first waveform or the second waveform for transmission of the second synchronization signal block or synchronization signal burst-set;
      determine a type of waveform of the first and second waveforms that was selected for transmission of at least a portion of the first or second synchronization signal block or synchronization signal burst-set based on a characteristic of the transmission of the respective first or second synchronization signal block or synchronization signal burst-set; and
      decode the first or second synchronization signal block or synchronization signal burst-set based on the determined waveform type;
      wherein one of the first or second waveforms includes an orthogonal frequency division multiplexed (OFDM) waveform, and the other of the first or second waveforms includes a low peak to average power ratio (PAPR) waveform having a PAPR less than the OFDM waveform.

23. The apparatus of claim 22, wherein the low peak to average power ratio (PAPR) waveform utilizes at least one of DFT-spread OFDM (DFT-S-OFDM), interleaved DFT-spread OFDM (IFDM), or direct time-domain modulation.

24. The apparatus of claim 22, wherein the characteristic includes a fixed pattern in time of transmissions of the first or second waveform.

25. The apparatus of claim 22, wherein the characteristic includes use of at least one of predefined RF frequency bands, carrier frequencies or system bandwidths that are correlate to one of the first or second waveform in the transmission of the first or second synchronization signal block or synchronization signal burst-set.

26. The apparatus of claim 22, wherein the characteristic includes placing the first or second synchronization signal block in a predetermined location having at least one of time or frequency location within transmission slot locations that correlate to one of the first or second waveform.

27. The apparatus of claim 22, wherein selecting one of the first waveform or the second waveform for transmission of the first and second synchronization signal blocks or synchronization signal burst-set includes applying the selection for a particular synchronization slot during transmission of at least one of the first and second synchronization signal blocks.

28. An apparatus for wireless communication, comprising:
a processor;
a transceiver communicatively coupled to the processor; and
a memory communicatively coupled to the processor,
wherein the processor is configured to:
determine at least first and second synchronization signal blocks that are each configurable for transmission using at least one of a first waveform or a second waveform;
select one of the first waveform or the second waveform for transmission of the first synchronization signal block;
select the other of the first waveform or the second waveform for transmission of the second synchronization signal block;
transmit via the transceiver the first and second synchronization signal blocks using the respectively selected first waveform or second waveform; and
indicate through a transmission characteristic of the transmission of the first or second synchronization signal block which of the first or second waveform is being selectively used for transmission of at least a portion of the first or second synchronization signal block over time;
wherein one of the first or second waveforms includes an orthogonal frequency division multiplexed (OFDM) waveform, and the other of the first or second waveforms includes a low peak to average power ratio (PAPR) waveform having a PAPR less than the OFDM waveform.

29. The apparatus of claim 28, wherein the low peak to average power ratio (PAPR) waveform utilizes at least one of DFT-spread OFDM (DFT-S-OFDM), interleaved DFT-spread OFDM (IFDM), or direct time-domain modulation.

30. The apparatus of claim 28, wherein the processor is further configured to transmit the first or second synchronization signal block or a synchronization signal burst-set using a fixed pattern in time of transmissions of the first or second waveform.

31. The apparatus of claim 30, wherein the processor is further configured to transmit the first or second synchronization signal block or the synchronization signal burst-set using the fixed pattern in time through:
transmitting the first or second synchronization signal block or the synchronization signal burst-set with the first waveform every $n^{th}$ transmission; and
transmitting the other of the first or second synchronization signal block or synchronization signal burst-set transmissions in interim periods with the second waveform.

32. The apparatus of claim 28, wherein the processor is further configured to indicate the first or second waveform through a transmission characteristic of transmitting the first or second synchronization signal block using at least one of predefined RF frequency bands, carrier frequencies or system bandwidths that correlate to one of the first or second waveform.

33. The apparatus of claim 28, wherein the processor is further configured to indicate a type of waveform through a transmission characteristic of placing the first or second synchronization signal block in a predetermined location having at least one of time or frequency location within transmission slot locations that correlate to one of the first or second waveform.

34. The apparatus of claim 28, wherein the processor is further configured to indicate a type of waveform through a transmission characteristic of a predefined frequency-hopping pattern within a system bandwidth across multiple time-instances of the synchronization signal block transmission that correlate to one of the first or second waveform.

35. The apparatus of claim 28, wherein the first or second synchronization signal block comprises a physical broadcast channel (pBCH).

* * * * *